(12) United States Patent
Ko

(10) Patent No.: US 12,530,089 B1
(45) Date of Patent: Jan. 20, 2026

(54) SMART KEYBOARD DEVICE

(71) Applicant: PIXART IMAGING INC., Hsin-Chu County (TW)

(72) Inventor: Yi-Hsien Ko, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 19/057,988

(22) Filed: Feb. 20, 2025

(51) Int. Cl.
*G06F 3/02* (2006.01)
*H01H 13/70* (2006.01)

(52) U.S. Cl.
CPC .............. *G06F 3/021* (2013.01); *H01H 13/70* (2013.01)

(58) Field of Classification Search
CPC .......... G06F 3/021; G06F 3/0208; G06F 3/01; H01H 13/70
See application file for complete search history.

(56) References Cited

U.S. PATENT DOCUMENTS

| | | | | |
|---|---|---|---|---|
| 7,843,575 B1* | 11/2010 | Starkey | ............... | G01B 11/026 356/614 |
| 8,816,964 B2* | 8/2014 | Edwards | ................. | G06F 3/021 345/168 |
| 2010/0148995 A1* | 6/2010 | Elias | ..................... | G06F 3/0488 178/18.03 |
| 2014/0035812 A1* | 2/2014 | Skurnik | ................ | G06F 3/0304 345/156 |
| 2017/0169967 A1* | 6/2017 | Chen | ..................... | H03K 17/968 |
| 2020/0278747 A1* | 9/2020 | Ligtenberg | ............ | G06F 3/0446 |

\* cited by examiner

*Primary Examiner* — Pegeman Karimi
(74) *Attorney, Agent, or Firm* — HAUPTMAN HAM, LLP

(57) ABSTRACT

There is provided a keyboard device including multiple optical sensors and an AI engine. The multiple optical sensors are arranged corresponding to multiple key caps and used to output time differential data, spatial differential data and raw data. The AI engine is used to determine a number of, positions of and output data format of enabled sensors among the multiple optical sensors corresponding to different work modes in a learning stage according to the time differential data, the spatial differential data and the raw data, and to output a control signal to perform a corresponding operation according to output data of enabled sensors of one work mode in an operation stage.

20 Claims, 6 Drawing Sheets

SMART KEYBOARD DEVICE

FIELD OF THE DISCLOSURE

This disclosure generally relates to a keyboard device and, more particularly, to a smart keyboard device that trains AI models corresponding to different work modes according to user operations based on output of multiple optical sensors arranged on a keyboard device so as to output control signals corresponding to the user operations in the different work modes, and an operating method of the smart keyboard device.

BACKGROUND OF THE DISCLOSURE

The keyboard device is one of important human-machine interfaces in computer systems. However, to perform a mode switching on present keyboard devices, a user needs to press at least one key, e.g., waking up sleep mode to a normal mode by pressing any key of a keyboard device, but the keyboard device is unable to automatically (without key being pressed) perform the mode switching according to usage habit of the user.

In another conventional method, a webcam is used to detect whether a user is close to the computer system so as to terminate the sleep mode. However, continuously turning on the webcam is power consuming. Furthermore, when a user is not intended to operate the computer system, the user may still sit in front of the webcam such that it is not able to identify whether the user is going to operate the computer system or not. Accordingly, mistakenly ending the sleep mode may occur from time to time.

The information disclosed in this BACKGROUND is merely intended to increase understanding of the general background of the invention and should not be taken as an admission or in any way implied that the relevant information constitutes prior art that is already known to a person of ordinary skill in the art.

SUMMARY

Accordingly, the present disclosure provides a smart keyboard device that is arranged with multiple optical sensors on the key area to detect user operations, and an operating method of the smart keyboard device.

The present disclosure further provides a smart keyboard device that determines a number of, positions of and output data format of enabled sensors corresponding to different work modes according to learning models constructed by a machine learning algorithm, and an operating method of the smart keyboard device.

The present disclosure further provides a smart keyboard device that lights up visual light sources of different keyboard regions corresponding to different work modes according to learning models constructed by a machine learning algorithm, and an operating method of the smart keyboard device.

The present disclosure provides a keyboard device including multiple key caps, multiple optical sensors and a processor. The multiple optical sensors are arranged corresponding to at least a part of the multiple key caps. The processor is configured to determine positions of, a number of and output data format of enabled sensors among the multiple optical sensors respectively in different work modes according to first output data of the multiple optical sensors, and construct application models corresponding to the different work modes according to second output data of the enabled sensors among the multiple optical sensors in the different work modes.

The present disclosure further provides a keyboard device including multiple key caps, multiple optical sensors, a memory and a processor. The multiple optical sensors are arranged corresponding to at least a part of the multiple key caps. The memory is configured to record application models associated with positions of, a number of and output data format of enabled sensors among the multiple optical sensors respectively corresponding to different work modes. The processor is configured to determine, in an operation stage, a control signal to control the keyboard device or a host coupled to the keyboard device according to current output data of the enabled sensors and the application models corresponding to the different work modes.

The present disclosure further provides an operating method of a keyboard device, which includes multiple optical sensors arranged corresponding to multiple key caps and an AI engine. The operating method includes the steps of: entering a first learning stage to cause the AI engine to receive first output data of the multiple optical sensors to determine positions of, a number of and output data format of enabled sensors among the multiple optical sensors in different work modes; entering a second learning state to cause the AI engine to receive second output data of the enabled sensors among the multiple optical sensors respectively in the different work modes to construct application models respectively corresponding to the different work modes; and determining, in an operation stage, a control signal to control a host coupled to the keyboard device according to current output data of the enabled sensors and the application models corresponding to the different work modes.

BRIEF DESCRIPTION OF DRAWINGS

Other objects, advantages, and novel features of the present disclosure will become more apparent from the following detailed description when taken in conjunction with the accompanying drawings.

DETAILED DESCRIPTION OF THE DISCLOSURE

It should be noted that, wherever possible, the same reference numbers will be used throughout the drawings to refer to the same or like parts.

One objective of the present disclosure is to provide a keyboard device that constructs different application models corresponding to different work modes by using an artificial intelligent (AI) engine to learn operating behaviors of a user in the different work modes based on output data of multiple optical sensors arranged on the keyboard device, and an operating method of the keyboard device. The application models are used to control keyboard device or a host coupled to the keyboard device according to output data of at least a part of the multiple optical sensors in an operation stage.

Figure 1:
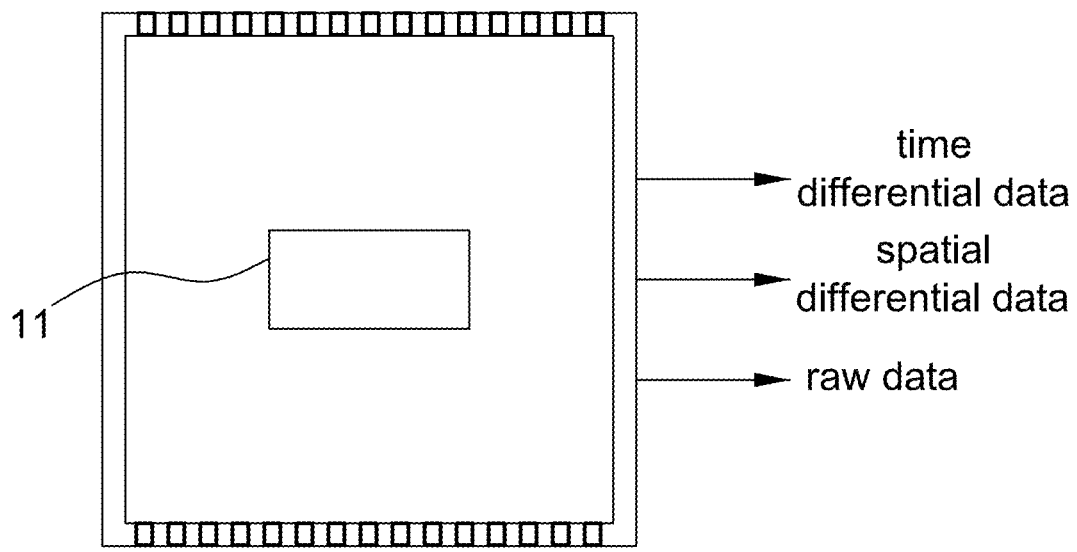
FIG. 1 is a schematic diagram of an optical sensor and output data thereof according to one embodiment of the present disclosure.

Please refer to FIG. 1, it is a schematic diagram of an optical sensor 100 and output data thereof according to one embodiment of the present disclosure. The optical sensor 100 is, for example, a complementary metal-oxide-semiconductor (CMOS) image sensor chip, which has a pixel array 11 formed by multiple pixels. The optical sensor 100 outputs data with different formats such as time differential data, spatial differential data and/or raw data (or called image data, i.e. data not being time differentiated or spatial differentiated).

In one aspect, the time differential data includes frame differential data and event information. The frame differential data is, for example, a gray level difference of pixel-to-pixel between different frames acquired at different times. For example, when the pixel array 11 includes 36×16 pixels, a number of 36×16 gray level differences between two frames are obtained. The event information includes information of whether each gray level difference exceeds a predetermined threshold or not. For example, if a gray level difference of one pixel between two frames acquired at two times exceeds the predetermined threshold, a digital value "1" is generated (i.e. event occurred); on the contrary, if the gray level difference of the one pixel between two frames acquired at two times does not exceed the predetermined threshold, a digital value "0" is generated (i.e. no event occurred), or vice versa. Therefore, 36×16 pixels generate a number of 36×16 digital values every two frames. In one aspect, the optical sensor 100 is arranged to output only the frame differential data and/or the event information of pixels that have the gray level difference exceeding the predetermined threshold (i.e., pixels having event). Therefore, the optical sensor 100 is able to output the time differential data with higher frame rate, e.g., larger than or equal to 1600 frames/second.

In one aspect, the spatial differential data includes pixel differential data and motion information. The spatial differential data is, for example, a sum of gray level differences between one pixel and 8 surrounding pixels thereof in one image frame, i.e. a sum of 8 gray level differences. Every pixel of the one image frame obtains one sum of 8 gray level differences. The motion information includes information of whether each sum of gray level differences exceeds a predetermined threshold or not. For example, if a sum of gray level differences associated with one pixel exceeds the predetermined threshold, a digital value "1" is generated (i.e. motion detected); on the contrary, if the sum of gray level differences associated with the one pixel does not exceed the predetermined threshold, a digital value "0" is generated (i.e. no motion detected), or vice versa. Since the optical sensor 100 calculates spatial differential data of every pixel of the pixel array 11, higher calculation is required and thus the optical sensor 100 outputs the spatial differential data with lower frame rate, e.g., larger than or equal to 5 frames/second.

The pixel circuit capable of outputting time differential data and image data may be referred to U.S. patent application Ser. No. 17/359,527, entitled "PIXEL CIRCUIT SELECTING TO OUTPUT TIME DIFFERENCE DATA OR IMAGE DATA" filed on Aug. 6, 2021, and assigned to the same assignee of the present application, and the full disclosure of which is incorporated herein by reference.

The optical sensor capable of outputting time differential data and spatial differential data may be referred to U.S. patent application Ser. No. 16/893,936, entitled "MOTION SENSOR USING TEMPORAL DIFFERENCE PIXELS AND LIFT-UP DETECTION THEREOF" filed on Jun. 5, 2020 as well as U.S. patent application Ser. No. 17/401,554, entitled "PIXEL CIRCUIT OUTPUTTING TIME DIFFERENCE DATA AND IMAGE DATA, AND OPERATING METHOD OF PIXEL ARRAY" filed on Aug. 13, 2021, and assigned to the same assignee of the present application, and the full disclosures of which are incorporated herein by reference.

Figure 2:
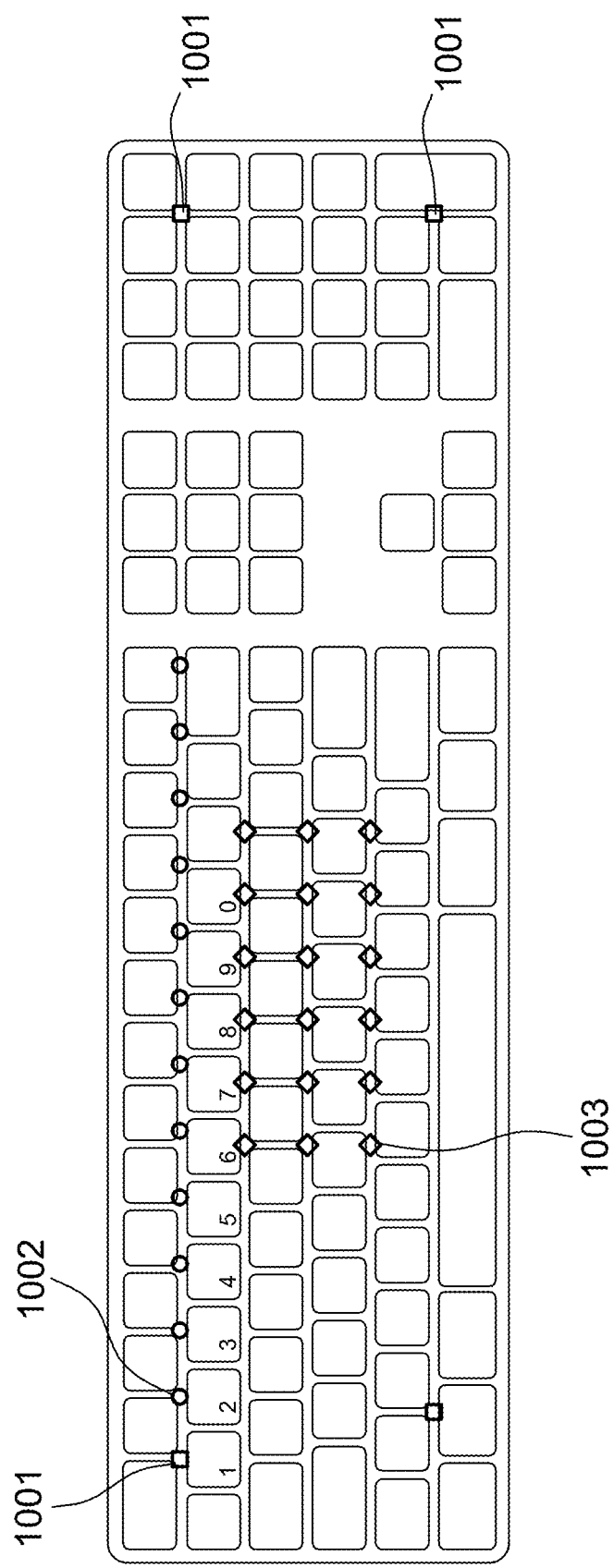
FIG. 2 is a schematic diagram of a keyboard device arranged with multiple optical sensors according to a first embodiment of the present disclosure.
Figure 3:
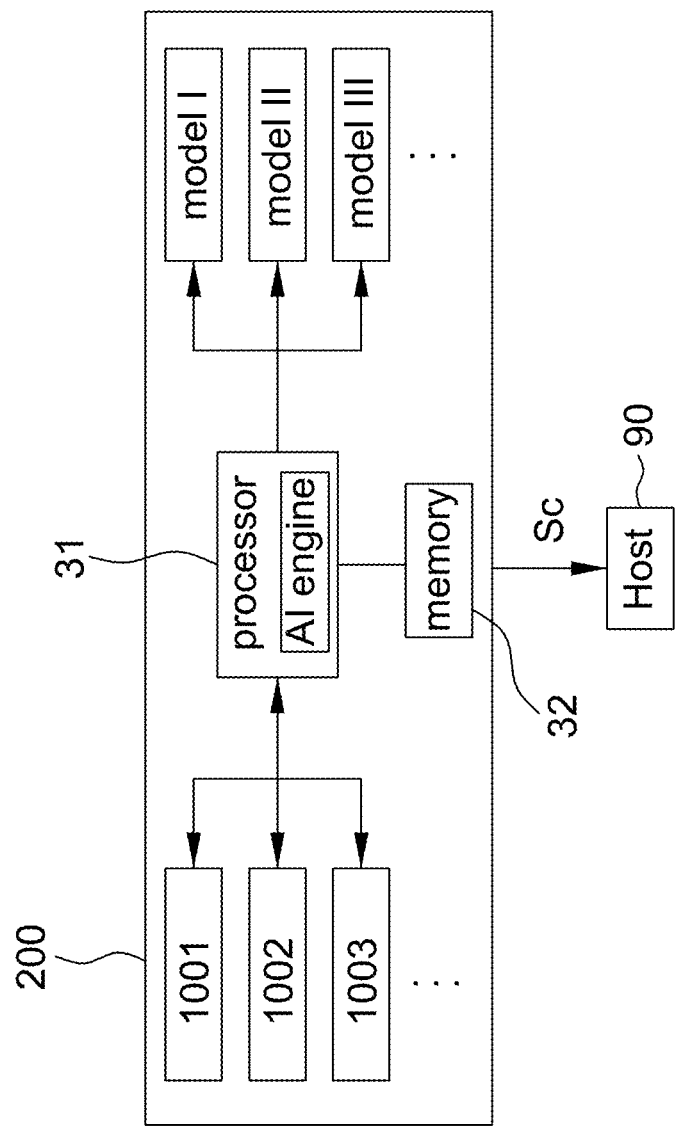
FIG. 3 is a schematic block diagram of a keyboard device according to a first embodiment of the present disclosure.

Please refer to FIGS. 2 and 3, FIG. 2 is a schematic diagram of a keyboard device 200 arranged with multiple optical sensors 1001, 1002 and 1003 according to a first embodiment of the present disclosure; and FIG. 3 is a schematic block diagram of a keyboard device 200 according to a first embodiment of the present disclosure.

The keyboard device 200 includes multiple key caps, multiple optical sensors 1001, 1002 and 1003, a processor 31 and a memory 32. It is appreciated that there is a component arranged below each key cap for detecting whether the key cap is pressed or not, which is known to the art and not a main objective of the present disclosure and thus details thereof are not described herein. Each key cap represents one key of the keyboard device 200.

The memory 32 includes a volatile memory and/or a non-volatile memory for recording application models and parameters thereof.

The host 90 is coupled to the keyboard device 200 using a wired communication interface or a wireless communication interface. The host 90 is any computer device using a keyboard as a human-machine interface, such as a notebook computer, a desk-top computer, a work station and a tablet computer, but not limited thereto. The wired communication interface and the wireless communication interface are known to the art and thus details thereof are not described herein.

The multiple optical sensors 1001, 1002 and 1003 are arranged corresponding to at least a part of, all of or only a part of, the multiple key caps. In the present disclosure, the multiple optical sensors 1001, 1002 and 1003 are respectively arranged between the multiple key caps or in the multiple key caps (e.g., each key cap having a transparent window for the optical sensor therein to receive incident light therethrough), and are not limited to those shown in FIG. 2. In addition, the optical sensors 1001, 1002 and 1003 are shown by different shapes in FIG. 2 to indicate that they are respectively enabled in different work modes (examples being given below). The optical sensors 1001, 1002 and 1003 are identical optical sensors as shown in FIG. 1.

The processor 31 is, for example, a micro processing unit (MCU), an application specific integrated circuit (ASIC) or a digital signal processor (DSP), but not limited to. The processor 31 determines positions of, a number of and output data format of enabled sensors among multiple optical sensors 1001, 1002 and 1003 respectively in different work modes according to first output data of the multiple optical sensors 1001, 1002 and 1003, and constructs application models (e.g., shown as models I, II and Ill in FIG. 3) corresponding to the different work modes according to second output data of the enabled sensors among the multiple optical sensors 1001, 1002 and 1003 in the different work modes.

More specifically, in different work modes, the positions of, the number of and the output data format of enabled sensors (capable of acquiring light and outputting data) among the multiple optical sensors 1001, 1002 and 1003 may be different from one another in the different work modes. For example, the optical sensors 1001 are enabled in a first mode, but are not enabled in second and third modes; the optical sensors 1002 are enabled in the second mode, but are not enabled in the first and third modes; and the optical sensors 1003 are enabled in the third mode, but is not enabled in the second and first modes, but not limited thereto. The enabled sensors are determined according to learning result of the AI engine of the processor 31. The AI engine uses, e.g., a neural network learning algorithm, a K-nearest neighbor algorithm, a classification algorithm or other machine learning algorithms to perform the machine learning and build up application models.

In one aspect, the first output data includes time differential data, spatial differential data and raw data outputted by all the optical sensors 1001, 1002 and 1003. The second output data includes time differential data, spatial differential data and raw data outputted by enabled sensors (e.g., at least one of 1001, 1002 and 1003), which are determined according to the learning result of the processor 31 based on the first output data. The output data format of the enabled sensors includes at least one of time differential data, spatial differential data and raw data, which is determined according to the learning result of the processor 31 based on the first output data.

The different work modes include, for example, a sleep mode, switching text input, running application software, gesture control and identity recognition.

For example, when the work mode is a sleep mode of the host 90, in a first learning stage, all the optical sensors 1001, 1002 and 1003 output time differential data, spatial differential data and raw data as the first output data. The processor 31 (more specifically AI engine thereof) learns optical sensors suitable for a user to wake up the sleep mode, e.g., 1001 close to four corners. Meanwhile, the processor 31 learns to know only the spatial differential data (but not limited to) needs to be used to identify whether the sleep mode is ended. In this case, the processor 31 determines enabled sensors corresponding to the sleep mode as 1001 (including positions and a number of 1001), and the output data format as spatial differential data. Therefore, the processor 31 informs each optical sensor 1001 to only output spatial differential data without outputting other data in the subsequent second learning stage and operation stage corresponding to the sleep mode. Or, each optical sensor 1001 still outputs all data in the second learning stage and operation stage but the processor 31 only uses the spatial differential data without using other data.

For example, when the work mode is the sleep mode of the host 90, in the second learning stage, the enabled sensors 1001 output spatial differential data. The processor 31 (more specifically AI engine thereof) learns an operation pattern of a user waking up the sleep mode, e.g., 1001 at a lower right corner of the keyboard device 200 firstly detecting an object and then 1001 at a upper right corner detecting the object (e.g., in this aspect the enabled sensors possibly including only two 1001 at right side of FIG. 2), which is only intended to illustrate and the actual pattern is determined by the machine learning algorithm. Accordingly, the processor 31 constructs an application model of ending the sleep mode to be recorded in the memory 32.

For example, the first learning stage includes a first predetermined number (or time interval) of detecting the sleep mode being terminated, and the second learning stage includes a second predetermined number (or time interval) of detecting the sleep mode being terminated, which may be determined before shipment or set by a user. The first predetermined number may be identical to or different from the second predetermined number.

In the present disclosure, the processor 31 further determines, in an operation stage, a control signal Sc according to current output data of the enabled sensors and the application models being constructed corresponding to the different work modes to control the keyboard device 200 and/or a host 90 coupled to the keyboard device 200.

For example, when the work mode is the sleep mode of the host 90, in the operation stage, the processor 31 determines a control signal Sc according to the spatial differential data (i.e. current output data) outputted by the enabled sensors 1001 and the application models in the memory 32. For example, when an object is detected by the 1001 at lower right corner and then detected by the 1001 at upper right corner, the processor 31 outputs the control signal Sc to wake up a screen and an operation system (OS) of the host 90. In this way, the sleep mode is ended correctly.

Some number keys (e.g., 5, 9, 10) are set at the same keys of Chinese phonetic symbol. Accordingly, in using a conventional keyboard device, a user needs to manually switch text input to correctly keyin a number character or a Chinese phonetic symbol.

For example, when the work mode is text input switching of the host 90 (e.g., between Chinese and English text input), in a first learning stage, all the optical sensors 1001, 1002 and 1003 output time differential data, spatial differential data and raw data as the first output data. The processor 31 (more specifically AI engine thereof) learns optical sensors suitable for a user to switch text input, e.g., 1002 close to number keys. Meanwhile, the processor 31 learns to know only the time differential data (but not limited to) needs to be used to identify whether the text input is desired to be switched. In this case, the processor 31 determines enabled sensors corresponding to the text input switching as 1002 (including positions and a number of 1002), and the output data format as time differential data. Therefore, the processor 31 informs each optical sensor 1002 to only output time differential data without outputting other data in the subsequent second learning stage and operation stage corresponding to the text input switching. Or, each optical sensor 1002 still outputs all data in the second learning stage and operation stage but the processor 31 only uses the time differential data without using other data.

For example, when the work mode is the text input switching of the host 90 (e.g., performing character input or running word processing software), in the second learning stage, the enabled sensors 1002 output time differential data. The processor 31 learns an operation pattern of a user in switching text input, e.g., lifting hand, which is only intended to illustrate and the actual pattern is determined by the machine learning algorithm. Accordingly, the processor 31 constructs an application model of text input switching to be recorded in the memory 32.

For example, the first learning stage includes a first predetermined number (or time interval) of detecting the text input switching, and the second learning stage includes a second predetermined number (or time interval) of detecting the text input switching, which may be determined before shipment or set by a user. Similarly, the first predetermined number may be identical to or different from the second predetermined number.

In the operation stage, the processor 31 determines a control signal Sc according to the time differential data (i.e. current output data) outputted by the enabled sensors 1002 and the application models in the memory 32. For example, when a hand is lifted in Chinese character input, the processor 31 outputs the control signal Sc to the OS of the host 90 to directly switch the Chinese-English text input switching (or directly outputting the user input as a number character) without manual switching. In this way, the text input speed is effectively increased.

In addition, arrangement of the first output data, the enabled sensors, the second output data and the current output data, construction of the application models and generation of the control signal Sc of other work modes, e.g., running application software, gesture control and identify recognition are similar to the above descriptions.

For example, when a user is playing a game software (i.e., running application software), the processor 31 determines enabled sensors (e.g., 1003, but not limited to) according to first output data (e.g., output data of all optical sensors) in a first learning stage; the processor 31 then constructs an application model according to second output data (e.g., output data of enabled sensors 1003) and user operation pattern in a second learning stage; and determines a control signal Sc to correspondingly control a screen displaying according to current output data (e.g., output data of enabled sensors) and a corresponding application model in an operation stage. For example, when a first one key (or key combination) of a sequence of successive pressing keys is pressed, key signals of the successive pressing keys are directly outputted, which is merely an example for illustration and the actual operation is determined by the machine learning algorithm.

For example, when a user is performing a gesture control, the processor 31 determines enabled sensors (e.g., 1002 and 1003, but not limited to) according to first output data (e.g., output data of all optical sensors) in a first learning stage; the processor 31 then constructs an application model according to second output data (e.g., output data of enabled sensors 1002 and 1003) and user gesture control pattern in a second learning stage; and determines a control signal Sc to control operations of a host 90 according to current output data (e.g., output data of enabled sensors) and a corresponding application stage. For example, when one gesture is detected, a predetermined APP is run or a predetermined key signal is outputted, which is merely an example for illustration and the actual operation is determined by the machine learning algorithm.

For example, when a user is performing a user identity recognition, the processor 31 determines enabled sensors (e.g., 1002 and 1003, but not limited to) according to first output data (e.g., output data of all optical sensors) in a first learning stage; the processor 31 then constructs an application model (e.g., recognizing a child or an adult according to an object size, which is merely an example for illustration and the actual operation is determined by the machine learning algorithm) according to second output data (output data of enabled sensors 1002 and 1003) and user identity recognition in a second learning stage; and determines a control signal Sc to control operations of a host 90 according to current output data (e.g., output data of enabled sensors) and a corresponding application model in an operation stage. For example, when a child is recognized, the websites can be logged in and the accumulated using time period are limited by the OS of the host 90, but not limited thereto.

In one aspect, the processor 31 automatically recognizes a work mode, e.g., sleep mode, text input switching, running APP and identify recognition (but not limited to) according to an operation status of the host 90 and enters the first learning stage and/or the second learning stage. In another aspect, the processor 31 knows the work mode, e.g., gesture control (but not limited to) when a predetermined signal is received thereby, e.g., pressing signal of key(s), and enters the first learning stage and/or the second learning stage.

It should be mentioned that the positions of, the number of and the output data format of enabled sensors corresponding to different work modes mentioned above are only intended to illustrate but not to limit the present disclosure.

It should be mentioned that the different work modes mentioned above are only intended to illustrate but not to limit the present disclosure. The work modes of the present disclosure may include other operations that use a keyboard device as an input interface of a host.

In the present disclosure, after the first learning stage and the second learning stage are accomplished, the memory 32 records application models associated with positions of, a number of and output data format of enabled sensors among the multiple optical sensors 1001, 1002 and 1003 respectively corresponding to different work modes. The processor 31 (more specifically AI engine thereof) determines, in the operation stage, a control signal Sc to control the keyboard 200 and/or a host 90 according to current output data of the enabled sensors and a corresponding application model corresponding to the different work modes.

In continuously using the keyboard device 200, the processor 31 further updates the positions of, the number of and the output data format of enabled sensors among the multiple optical sensors 1001, 1002 and 1003 associated with application models corresponding to the different work modes according to output data of the multiple optical sensors 1001, 1002 and 1003, wherein the output data includes time differential data, spatial differential data and raw data. For example, when a user considers the learning performance is not good enough or requires a new learning process (e.g., user being changed or a new model required), the user may execute a predetermined APP or press a predetermined key (or key combination) to re-execute the first learning stage and the second learning stage to construct new application models corresponding to different work modes using the method mentioned above.

Figure 4:
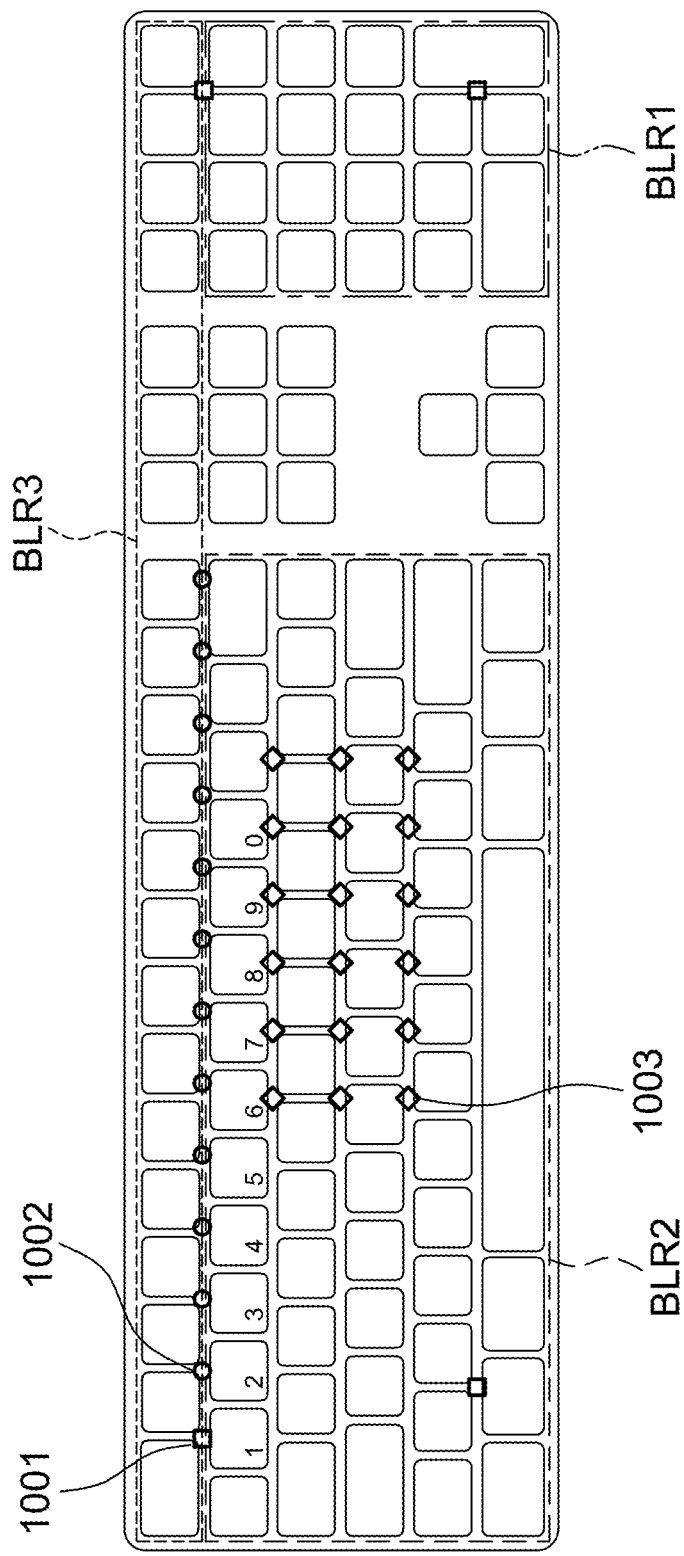
FIG. 4 is a schematic diagram of a keyboard device arranged with multiple optical sensors and backlight regions according to a second embodiment of the present disclosure.
Figure 5:
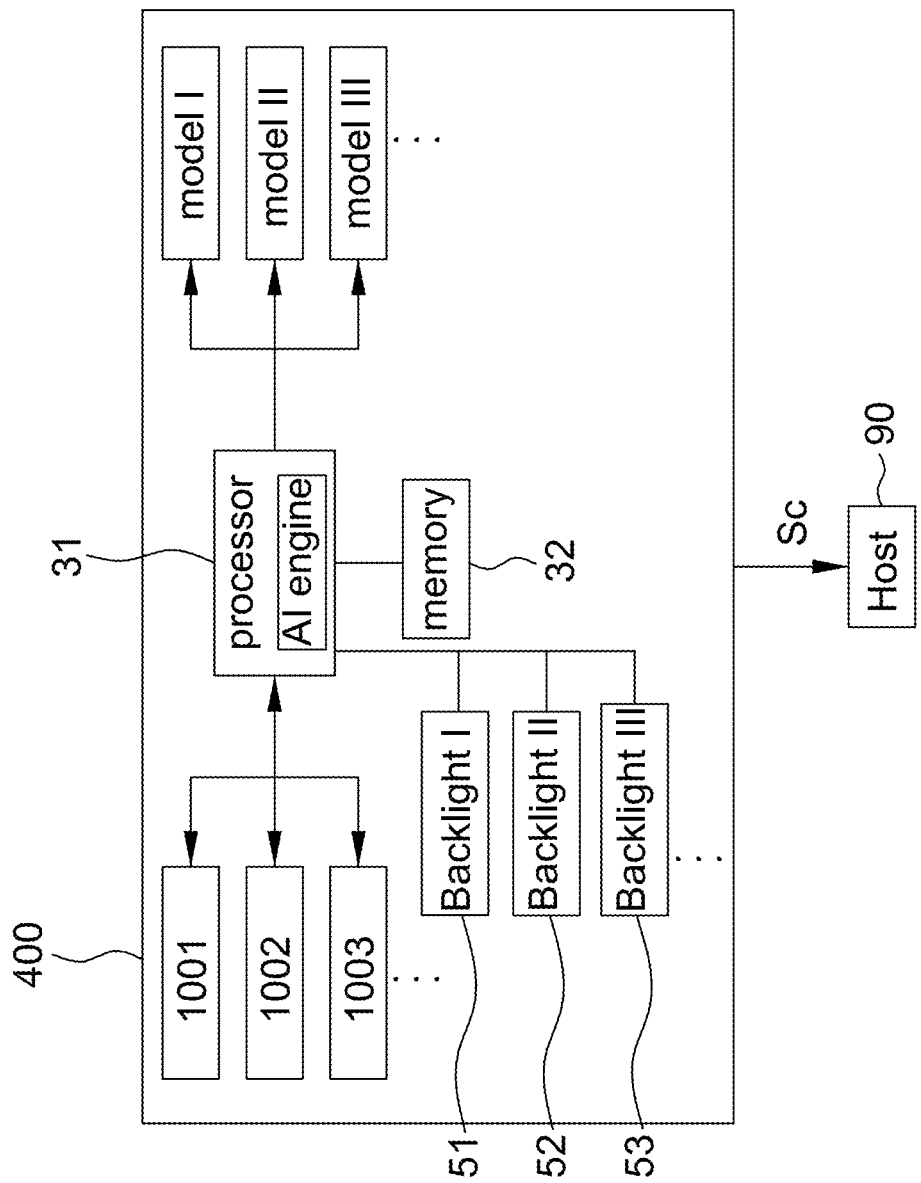
FIG. 5 is a schematic block diagram of a keyboard device according to a second embodiment of the present disclosure.

Please refer to FIGS. 4 and 5, FIG. 4 is a schematic diagram of a keyboard device 400 arranged with multiple optical sensors 1001, 1002 and 1003 and backlight regions BLR1, BLR2 and BLR3 according to a second embodiment of the present disclosure; and FIG. 5 is a schematic block diagram of a keyboard device 400 according to a second embodiment of the present disclosure. The difference between the keyboard device 400 and the keyboard device 20 is that the keyboard device 400 further includes multiple backlights (e.g., shown as 51, 52 and 53, but not limited to) arranged corresponding to multiple regions (e.g., shown as BLR1, BLR2 and BLR3, but not limited to) of the multiple key caps. Each backlight is formed by one or multiple light emitting diodes (LED) or laser diodes (LE). When one backlight region is lighted up, the visual effect to the user is generated so as to improve the user experience.

As described in the above first embodiment, after determining positions of enabled sensors corresponding to different work modes in a first learning stage, the processor 31 lights up, in the operation mode, backlight regions corresponding to the enabled sensors in the different work modes. Operations of the first learning stage, the second learning stage and the operation stage are identical to those of the keyboard device 200, and thus details thereof are not repeated again.

Figure 6:
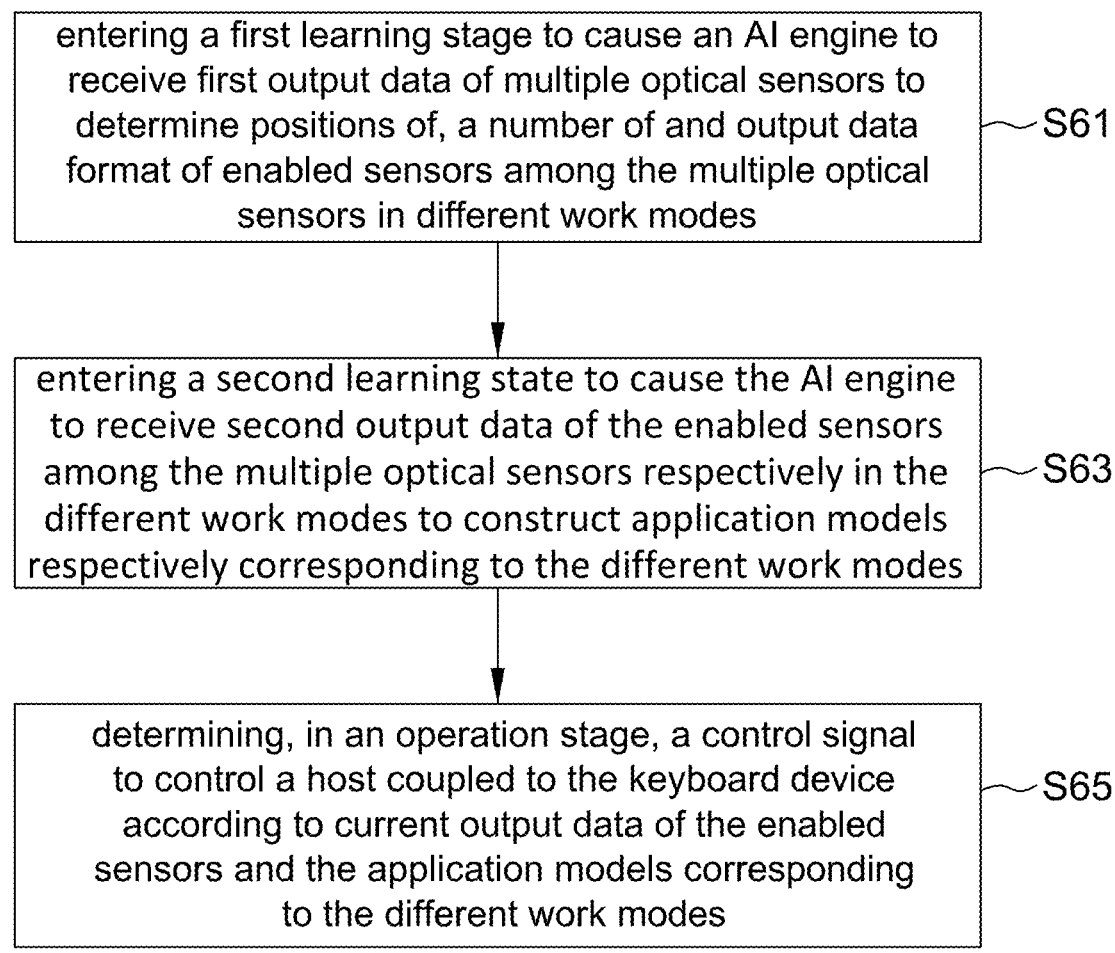
FIG. 6 is a flow chat of an operating method of a keyboard device according to one embodiment of the present disclosure.

Please refer to FIG. 6, it is a flow chart of an operating method of a keyboard device 200 and 400 according to one embodiment of the present disclosure, including the steps of: entering a first learning stage to cause an AI engine (i.e. the processor 31) to receive first output data of multiple optical sensors 1001, 1002 and 1003 to determine positions of, a number of and output data format of enabled sensors among the multiple optical sensors 1001, 1002 and 1003 in different work modes (Step S61); entering a second learning state to cause the AI engine to receive second output data of the enabled sensors among the multiple optical sensors 1001, 1002 and 1003 respectively in the different work modes to construct application models respectively corresponding to the different work modes (Step S63); and determining, in an operation stage, a control signal Sc to control a keyboard device 200, 400 and/or a host 90 according to current output data of the enabled sensors and the application models corresponding to the different work modes (Step S65).

The first output data includes time differential data, spatial differential data and/or raw data. As mentioned above, the positions of, the number of and the output data format of the enabled sensors may be different from one another in the different work modes.

The second output data and the current output data respectively include at least one of the time differential data, the spatial differential data and the raw data, which is determined according to the learning result in the first learning stage. The output data format includes at least one of the time differential data, the spatial differential data and the raw data, which is determined according to the learning result in the first learning stage.

In the second embodiment, the keyboard device 400 further includes multiple backlights. The operating method further includes the step of: lighting up backlight regions corresponding to the enabled sensors in the operation stage.

As mentioned above, the application models and the enabled sensors corresponding to different work modes may be continuously updated with the operation of the keyboard 400.

It should be mentioned that although the present disclosure is described in the way that different stages of the keyboard device is executed by a processor in the keyboard device, it is only intended to illustrate but not to limit the present disclosure. In other aspects, the time differential data, the spatial differential data and the raw data are directly transmitted (via wired or wireless communication interface) to a processor (e.g., e.g., MCU, CPU or GPU) of the host 90 to be processed thereby and then accordingly perform each function mentioned in the above embodiments.

It should be mentioned that the positions and numbers of the optical sensors, the positions and numbers of the enabled sensors and the positions and numbers of the backlights mentioned herein are only intended to illustrate but not to limit the present disclosure.

As mentioned above, a user needs to physically press at least one key of conventional keyboard devices to switch an operation mode. Accordingly, the present disclosure further provides a smart keyboard device that controls different operations corresponding to different work modes according to output data of multiple optical sensors (e.g., FIGS. 2-5) and an operating method thereof (e.g., FIG. 6) that construct learning modes to perform different applications corresponding to different work modes according to output data of the multiple optical sensors. In addition, the keyboard device may further be arranged with multiple backlights, and a part of which is lighted up corresponding to an operated region of a user so as to provide a visual effect to users to improve the user experience.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

The invention claimed is:

1. A keyboard device, comprising:
multiple key caps;
multiple optical sensors, arranged corresponding to at least a part of the multiple key caps; and
a processor, configured to
  determine positions of, a number of and output data format of enabled sensors among the multiple optical sensors respectively in different work modes according to first output data of the multiple optical sensors, and
  construct application models corresponding to the different work modes according to second output data of the enabled sensors among the multiple optical sensors in the different work modes.

2. The keyboard device as claimed in claim 1, wherein
the first output data comprises time differential data and spatial differential data outputted by all the optical sensors, and
the second output data comprises at least one of the time differential data and the spatial differential data outputted by the enabled sensors.

3. The keyboard device as claimed in claim 1, wherein the output data format of the enabled sensors comprises at least one of time differential data and spatial differential data.

4. The keyboard device as claimed in claim 1, wherein the multiple optical sensors are respectively arranged between the multiple key caps or in the multiple key caps.

5. The keyboard device as claimed in claim 1, wherein the different work modes comprise a sleep mode, running application software, switching text input, gesture control and identity recognition.

6. The keyboard device as claimed in claim 1, wherein the processor is further configured to
determine, in an operation stage, a control signal according to current output data of the enabled sensors and the application models corresponding to the different work modes to control the keyboard device or a host coupled to the keyboard device.

7. The keyboard device as claimed in claim 6, further comprising multiple backlights arranged corresponding to multiple regions of the multiple key caps, wherein the processor is further configured to
light up backlight regions corresponding to the enabled sensors in the operation stage.

8. A keyboard device, comprising:
multiple key caps;
multiple optical sensors, arranged corresponding to at least a part of the multiple key caps;
a memory, configured to record application models associated with positions of, a number of and output data format of enabled sensors among the multiple optical sensors respectively corresponding to different work modes; and
a processor, configured to determine, in an operation stage, a control signal to control the keyboard device or a host coupled to the keyboard device according to current output data of the enabled sensors and the application models corresponding to the different work modes.

9. The keyboard device as claimed in claim 8, wherein the processor is further configured to
update the positions of, the number of and the output data format of enabled sensors among the multiple optical sensors associated with the application models corresponding to the different work modes according to output data of the multiple optical sensors.

10. The keyboard device as claimed in claim 9, wherein the output data comprises time differential data and spatial differential data.

11. The keyboard device as claimed in claim 8, wherein the output data format of the enabled sensors comprises at least one of time differential data and spatial differential data.

12. The keyboard device as claimed in claim 8, wherein the multiple optical sensors are respectively arranged between the multiple key caps or in the multiple key caps.

13. The keyboard device as claimed in claim 8, wherein the different work modes comprise a sleep mode, running application software, switching text input, gesture control and identity recognition.

14. The keyboard device as claimed in claim 8, further comprising multiple backlights arranged corresponding to multiple regions of the multiple key caps, wherein the processor is further configured to light up backlight regions corresponding to the enabled sensors in the operation stage.

15. An operating method of a keyboard device, the keyboard device comprising multiple optical sensors arranged corresponding to multiple key caps and an artificial intelligent (AI) engine, the operating method comprising:
entering a first learning stage to cause the AI engine to receive first output data of the multiple optical sensors to determine positions of, a number of and output data format of enabled sensors among the multiple optical sensors in different work modes;
entering a second learning state to cause the AI engine to receive second output data of the enabled sensors among the multiple optical sensors respectively in the different work modes to construct application models respectively corresponding to the different work modes; and
determining, in an operation stage, a control signal to control a host coupled to the keyboard device according to current output data of the enabled sensors and the application models corresponding to the different work modes.

16. The operating method as claimed in claim 15, wherein the first output data comprises time differential data and spatial differential data, and
the second output data and the current output data respectively comprise at least one of the time differential data and the spatial differential data.

17. The operating method as claimed in claim 16, wherein the output data format comprises at least one of the time differential data and the spatial differential data.

18. The operating method as claimed in claim 15, wherein the different work modes comprise a sleep mode, running application software, switching text input, gesture control and identity recognition.

19. The operating method as claimed in claim 15, wherein the positions of, the number of and the output data format of the enabled sensors are different from one another in the different work modes.

20. The operating method as claimed in claim 15, wherein the keyboard device further comprises multiple backlights corresponding to multiple regions of the multiple key caps, and the operating method further comprises:
lighting up backlight regions corresponding to the enabled sensors in the operation stage.

* * * * *